3,186,983
CYCLIC AMIDES AND A PROCESS FOR THE
PREPARATION THEREOF
Kenneth C. Stueben, Somerville, N.J., assignor to Union
Carbide Corporation, a corporation of New York
No Drawing. Filed Apr. 9, 1962, Ser. No. 185,860
14 Claims. (Cl. 260—239.3)

This invention relates to linear, thermoplastic polyamides prepared from an organic dicarboxylic acid or its amide forming derivatives, and 1,2-bis(aminomethyl)-cyclobutane and to cyclic amides which are intermediates in the preparation of the polyamides.

The linear, thermoplastic polyamides of this invention generally have a reduced viscosity in the range of from about 0.2 to about 2.0 and contain a plurality of recurring structural units having the formula:

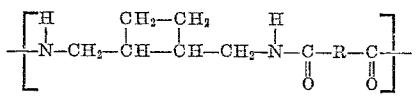

Formula I wherein R is a divalent hydrocarbon radical.

The cyclic amides of the present invention have the formula:

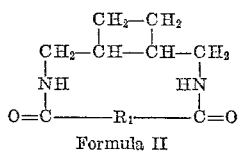

Formula II wherein $R_1$ is as defined for R.

Reduced viscosity values noted herein were determined at 25° C. using a solution having a concentration of 0.2 gram of polyamide per 100 milliliters of solvent. The time of flow in a viscosimeter for both the solvent and for the polyamide solution was determined and reduced viscosity calculated using the equation:

$$R.V. = \frac{T_1 - T_2}{T_2 C}$$

wherein:

$T_1$=the efflux time for the polyamide solution.
$T_2$=the efflux time for the solvent.
C=concentration of the polyamide solution in grams of polyamide per 100 milliliters of solvent.

Illustrative of suitable divalent hydrocarbons for R are those which generally contain 2 to 12 carbon atoms inclusive and preferably those which contain from 6 to 10 carbon atoms inclusive. Exemplary of such divalent hydrocarbon radicals are ethylene, propylene, trimethylene, tetramethylene, pentamethylene, hexamethylene, heptamethylene, octamethylene and the like; arylene radicals such as phenylene and other like arylene radicals generally containing 6 to 12 carbon atoms inclusive and preferably containing 6 carbon atoms; cycloalkylene radicals such as cyclobutane-1,2, cyclohexane-1,2- and other like cycloalkylene radicals generally containing 3 to 6 carbon atoms inclusive and preferably containing 4 to 6 carbon atoms inclusive.

Particularly desirable polyamides for purposes of this invention are those having recurring structural units falling within the scope of Formula I wherein R is an alkylene radical having 2 to 10 carbon atoms inclusive.

The polyamides of the present invention have a great variety of uses as they are available in both the amorphous and crystalline state. That is, in those instances wherein the polyamides of the present invention, as prepared, are in the crystalline state, they can be converted to the amorphous state by rapid cooling, e.g., by quenching of a molten film of the polyamide. X-ray diffraction pattern of polyamides so treated reveals no measurable amount of crystallinity, that is, there is a lack of sharp rings in the X-ray diffraction pattern. As compared to currently known crystalline polyamides, the polyamides of the present invention, in their amorphous state, have lower flow points. Consequently, the polyamides, in the amorphous state, are much more readily fabricated into self-sustaining film and molded articles, than the presently known crystalline polyamides. A method for determining flow points of polyamides is described by Sorenson and Campbell in their book entitled "Preparative Methods of Polymer Chemistry," Interscience Publishers (1961) at pages 49–51. In addition, elongated structures such as film and filaments, produced from polyamides of this invenion in the amorphous state, can be elongated to a high degree without rupturing.

Furthermore, film produced from the polyamides of the present invention, in their amorphous state, has excellent gloss and excellent transparency and is excellently suited for packaging purposes.

The linear, thermoplastic polyamides of the present invention can be prepared by reacting and polymerizing a compound having the formula:

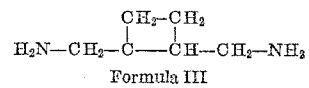

Formula III with a compound having the formula:

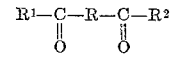

Formula IV wherein R is as previously defined and $R^1$ and $R^2$, which can be the same or different, are hydroxyl, halogen, alkoxy or phenoxy radicals, or an anhydride of an acid falling within the scope of Formula IV above wherein $R^1$ and $R^2$ are hydroxyl.

Illustrative of suitable compounds falling within the scope of Formula IV above when $R^1$ and $R^2$ are hydroxyl and when R is alkylene are succinic acid, glutaric acid, adipic acid, pimelic acid, suberic acid, azelaic acid, sebacic acid, isosebacic acid, brassylic acid, 2-ethylsuberic acid, α,α'-diethyladipic acid, and the like; when R is cycloalkylene, 1,2-cyclobutane dicarboxylic acid, 1,3-cyclobutane dicarboxylic acid, 1,3-cyclopentane dicarboxylic acid, 1,3-cyclohexane dicarboxylic acid, 1,4-cyclohexane dicarboxylic acid, and the like; when R is arylene, phthalic acid, terephthalic acid, isophthalic acid, xylidinic acid, cumidic acid, naphthalic acid, and the like; when R is a substituted alkylene or arylene radical, diglycolic acid, diphenyl ether-4,4'-dicarboxylic acid, thiodiacetic acid, diphenyl sulfide-4,4'-dicarboxylic acid, and the like; when R is an unsaturated radical, fumaric acid, glutaconic acid, and the like.

Exemplary of compounds falling within the scope of Formula IV above, when either or both of $R^1$ and $R^2$ are halogen, that is, fluorine, chlorine, bromine, or iodine, the mono-fluoride, mono-chloride, mono-bromide and mono-iodide of the above-named acids and the difluoride, dichloride, dibromide and diiodide of the above-named acids.

Among suitable compounds included within the scope of Formula IV above wherein either or both $R^1$ and $R^2$ are alkoxy or phenoxy, which can be reacted to produce the polyamides of the present invention, are those wherein $R^1$ and/or $R^2$ represent radicals such as phenoxy, phenylphenoxy, methylphenoxy, chlorophenoxy, dichlorophenoxy, methoxy, ethoxy, n-propoxy, isopropoxy, n-butoxy, isobutoxy, sec-butoxy, n-amoxy, n-hexoxy, 2-ethylhexoxy, n-octoxy, n-nonoxy, n-decoxy and the like. Specific compounds which can be noted are monoesters, such as the monophenyl, monochlorophenyl, mono(dichlorophenyl), mono(4-methylphenyl), monomethyl, monoethyl, mono-n-propyl, mono-n-hexyl and mono-n-decyl, esters of the above-named acids and diesters such as the diphenyl, bis(chlorophenyl), dimethyl, diethyl, di-n-propyl, di-n-butyl, di-n-hexyl and di-n-decyl esters of said acids.

Other suitable compounds included within the general Formula III above are the mixed ester-halides of said acids, that is, those compounds wherein $R^1$ is a halogen and $R^2$ is an alkoxy or phenoxy radical. An illustrative example of these compounds is the methyl ester of the monoacid chloride of adipic acid.

It is to be understood that mixtures of organic dicarboxylic acids and 1,2-bis(aminomethyl)cyclobutane can be reacted to produce the polyamides of the present invention.

The reaction which results in the preparation of linear, thermoplastic polyamides of the present invention can be illustrated by the following equation wherein the reactants are represented by general formulas:

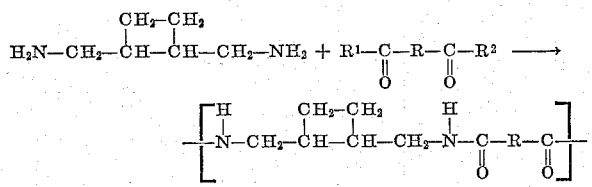

The reaction can be conducted by using various amounts of the reactants. Generally, the 1,2-bis(aminomethyl)cyclobutane is used in amounts of from at least about 90 percent of stoichiometric to above 100 percent or more in excess of stoichiometric. Usually, however, it is preferred to use about stoichiometric amounts. In determining stoichiometric amounts one amine group

is considered to react with one carbonyl group

In those instances where there is used a compound falling within the scope of Formula IV wherein one or both of $R^1$ and $R^2$ are halogen, and when 1,2-bis(aminomethyl)cyclobutane is used in an amount less than about 100 percent in excess of stoichiometric . . ., it is customary to have present in the reaction mixture a hydrogen halide acceptor, that is, a compound which will react with and neutralize the free hydrogen halide in the reaction mixture. Among suitable hydrogen halide acceptors which can be noted are the water-soluble inorganic bases, as for example, the alkali metal hydroxides, carbonates, or bicarbonates such as sodium, potassium or lithium hydroxide and sodium, potassium or lithium carbonate or bicarbonate. Also suitable are organic bases such as tertiary amines including for example, trimethylamine, triethylamine, tri-n-propylamine, tri-n-butylamine, tri-n-dodecylamine, tri-n-docosylamine, tri-(2-phenylethyl) amine, tribenzylamine, dimethyl-n-propylamine, diethyl-n-propylamine, methylethyl-n-propylamine, pyridine, methylpyridine and the like. Particularly effective tertiary amines are those having the general formula:

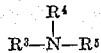

wherein $R^3$, $R^4$ and $R^5$, which can be the same or different, are either alkyl or aralkyl radicals, each having a maximum of twelve carbon atoms.

The amount of hydrogen halide acceptor used will depend upon the amount of the bis(aminomethyl)cyclobutane reactant in the polymerization reaction mixture. When there is sufficient excess of the diamine to react with and neutralize all of the hydrogen halide by-product liberated no additional hydrogen halide acceptor need be used. The diamine is usually present in about stoichiometric amounts, and it is thus desirable to add sufficient amounts of hydrogen halide acceptor to at least neutralize substantially all of the hydrogen halide by-product. Preferably the amounts of added hydrogen halide acceptor are within the range of from about one to about five times the amount equivalent to the liberated hydrogen halide by-product.

If desired, the polymerization reaction can be conducted in contact with an inert, liquid diluent. Such diluent, when used, must be non-reactive with the starting materials and with the polyamide product. The inert, liquid diluent may be a solvent for the starting materials, for the polyamide product, or both, as desired. Thus, it is possible to conduct the polymerization reaction using an inert, liquid diluent which is a solvent for the starting materials and a non-solvent for the polyamide product; or to conduct the polymerization reaction using an inert, liquid diluent which is a solvent for the polyamide only. Suitable inert, liquid diluents which can be used depending on the particular reactants and the product obtained include water, monohydric phenols, such as, for example, phenol, m-cresol, o-cresol, p-cresol, xylenol and the like; aromatic hydrocarbons such as benzene, toluene, xylene and the like; chlorinated aromatic hydrocarbons such as chlorobenzene and the like; aliphatic hydrocarbons such as n-hexane, n-heptane and the like; halogenated aliphatic hydrocarbons such as dichloromethane, dichloroethane, tetrachloroethane and the like; ethers such as diethyl ether of ethylene glycol, diethyl ether of 1,2-propylene glycol, dioxane and the like. Other suitable diluents include acetone, alcohols, high-boiling petroleum hydrocarbons and the like. Suitable diluents to be used for any specific mode of operation will be obvious to those skilled in the art.

The polymerization reaction is generally conducted at atmospheric pressure, although superatmospheric or subatmospheric pressures can be used if so desired.

Temperatures employed for the polymerization reaction can also vary over a wide range, generally from about −10° C. to about 325° C. The specific temperature range chosen will vary in accordance with the particular reactants and reaction pressures and with the specific mode of operation chosen, as more fully defined below.

When operating at temperatures between about 150° C. and about 325° C., it is usually desirable and generally preferable to provide in the reaction zone an inert dry gas atmosphere. Suitable inert gases for this purpose include, for example, nitrogen, helium, argon, and the like. It is generally preferred to use nitrogen or argon.

The polymerization reaction can be conducted with or without the addition of a catalyst, as desired. Suitable catalysts that can be used include strong acids such as phosphoric acid, sulfuric acid and the like.

It may be desirable in some instances to limit the average molecular weight (that is, the degree of polymerization) of the polyamide product. This can be accomplished by adding a chain terminator to the reaction mixture when the polyamide has attained the desired reduced viscosity. Suitable chain terminators include monocarboxylic acids of the general formula $R_4COOH$ or monoamines of the general formula $R_4NH_2$ wherein $R_4$ in each instance represents a saturated aliphatic or cycloalkyl radical having a maximum of 12 carbon atoms. Exemplary of such radicals are straight or branched chain alkyl or cycloalkyl radicals such as methyl, ethyl, n-propyl, isopropyl, n-butyl, sec-butyl, n-amyl, 2-ethylhexyl, n-decyl, n-dodecyl, cyclohexyl and the like. Specific chain terminators include acetic acid, propionic acid, 2-ethylhexanoic acid, n-decanoic acid, methylamine, 2-ethylhexylamine, cyclohexylamine and other like compounds.

Recovery of the linear polyamide product from the reaction mixture is readily accomplished by conventional methods. For example, when a diluent is used which is a solvent for the starting materials and a non-solvent for the polyamide product, the polyamide can be recovered as a precipitate from the reaction mixture. Similarly, when the polymerization reaction is conducted with the use of a diluent which is a solvent for the polyamide product, the polyamide may be recovered by adding to the reaction product mass a non-solvent for the polyamide which will cause precipitation of the polyamide.

Various specific modes of operation can be used in conducting the polymerization reaction which results in the preparation of the polyamides of this invention. A particularly desirable method when either or both of $R^1$ and $R^2$ are halogens is by the so-called "interfacial" method. This method is described in Example III of this application.

In another specific mode of operation, the polyamides of the present invention can be prepared by forming a salt of 1,2-bis(aminomethyl)cyclobutane and a dibasic acid and thereafter heating the salt at a temperature of about 200° C. to about 300° C. and under a pressure of less than about 1 mm. of Hg, generally under an atmosphere of an inert gas such as argon.

The salt is usually prepared by admixing equimolar amounts of the reactants in an inert solvent such as ethyl alcohol and n-propyl alcohol and allowing the resultant solution to stand at room temperature, about 25° C., until precipitation of the salt out of solution is complete. As a rule, this takes about 2 to 6 hours. The salt is then conveniently recovered as a filter cake.

The cyclic amides of this invention are prepared by heating the salt, formed as described in the preceding sentence at a temperature of about 260° C. to about 300° C. under a pressure of about 0.1 mm. of Hg to about 0.4 mm. of Hg and recovering the sublimate which forms.

Preparation of 1,2-bis(aminomethyl)cyclobutane can be conveniently accomplished by dimerizing acrylonitrile in a manner described by Coyner et al. in J. Am. Chem. Soc. 71 (1949), page 324 and hydrogenating the resultant nitrile.

In the examples which follow, tests were conducted according to the following procedures:

Tensile modulus _____ ASTMD–882–52T.
Percent elongation ____ ASTMD–882–54T.
Impact strength _____ Film specimens 1.5 inches wide.

were cut from a film having a thickness of about 0.01 inch, prepared as described in Example 1 of this specification. The impact tester used was identical to that described in ASTM test D–256–56 with the following exceptions: The pendulum actually used was a steel pendulum, cylindrical in shape with a diameter of 0.85 inch and weighing 1.562 lbs. The striking piece of the pendulum, mounted almost at the top of the pendulum was a cylinder 0.3 inch in diameter. Each film specimen was clamped between jaws of the tester, which were spaced 1 inch apart, with the 0.125 inch width mounted vertically. The pendulum was raised to a constant height to deliver 1.13 ft.-lbs. at the specimen. When the pendulum was released, the cylindrical striking piece hit the specimen with its flat end, broke the specimen, and travelled to a measured height beyond. The difference between the height travelled by the pendulum with no film in its path minus the height to which it travelled with the film in its path was converted to energy in foot-pounds. On dividing this value by the volume of that portion of the sample located between the jaws of the tester, the tensile impact strength in foot-pounds per cubic inch was obtained. Each test result reported is the average value obtained using 5 specimens as described. Each test was conducted in an atmosphere which was at 25° C. and at 40 percent relative humidity.

*Example 1*

A solution of 36.5 grams (0.25 mole) of adipic acid in 250 ml. of ethyl alcohol was combined with a solution of 28.53 grams (0.25 mole) of trans-1,2-bis(aminomethyl)cyclobutane in 75 ml. of ethyl alcohol. The resultant solution was allowed to stand at room temperature about 25° C. for 5 hours with the result that a white, crystalline precipitate formed. The precipitate was recovered as a filter cake, washed with boiling ethyl alcohol and air dried overnight. The salt thus produced had a melting point of 198° C.–199° C.

A 3 gram sample of the salt was heated in a sealed tube, under an initial pressure of 0.1 mm. of Hg, at a temperature of 215° C. for 2.5 hours. The tube was then opened and placed in a sidearm test tube which was equipped with a gas inlet tube. The contents of the tube were heated under atmospheric pressure at a temperature of 270° C. for 45 minutes in an argon gas atmosphere. A pressure of 0.1 to 0.3 mm. of Hg was then effected in the tube and the contents of the tube heated for 90 minutes at a temperature of 270° C. During this latter heating cycle, the sublimate which formed was recovered and identified as a cyclic amide having the formula:

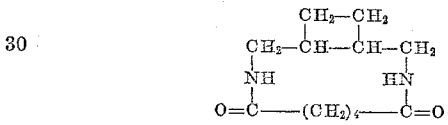

by elemental analysis, infrared analysis and molecular weight determination.

*Elemental analysis for* $C_{12}H_{20}O_2N_2$.—Found (percent): C, 64.03; H, 8.79; N, 12.39. Calculated (percent): C, 64.25; H, 8.99; N, 12.49.

Molecular weight was determined to be 219 using a ebullioscopic determination with dimethyl formamide.

The residue remaining in the flask were heated another 1.5 hours at a temperature of 270° C. and under a pressure of 0.1 to 0.3 mm. of Hg.

The polyamide so produced was light tan in color and very tough. It had a reduced viscosity in a 60–40 mixture, by weight, of phenol and tetrachloroethane of 1.23. The polyamide was soluble in an 80–40 mixture, by weight, of ethyl alcohol and water, was insoluble in dimethylformamide and had a crystalline melting point of 200° C.

*Elemental analysis for* $(C_{12}H_{20}O_2N_2)_n$.—Found (percent): C, 62.61; H, 8.80; N, 12.09. Calculated (percent): C, 64.25; H, 8.99; N, 12.49.

A self-sustaining film, 3 mils thick, was prepared by compression molding a sample of the polyamide.

Properties (film): Tensile modulus=210,000 p.s.i.

A portion of the film was placed between two hollow electrically heated press plates. The plates were pressed together and heated until the polymer became molten. The electricity was then shut off and cold water was immediately run thru the plates and the polymer solidified. The X-ray diffraction pattern of the polymer so treated revealed no measurable amount of crystallinity, that is, there was a lack of sharp rings in the pattern.

Example 1 was repeated using in lieu of adipic acid, "isosebacic" acid in the same equivalent amount. The polyamide produced had a reduced viscosity in a 60–40 mixture, by weight, of phenol and tetrachloroethane of 0.7.

The "isosebacic" acid used was made up of 80 parts by weight 2-ethyl suberic acid, 12 parts by weight α,α′-diethyl adipic acid, and 8 parts by weight sebacic acid.

The crystalline nature of the polyamides noted in this and in subsequent examples were confirmed by X-ray analysis and by stiffness-temperature curves obtained by plotting the tensile modulus v. temperatures.

*Example 2*

Following the procedure set forth in Example 1, a polyamide was prepared using 50.5 grams (0.25 mole) of sebacic acid and 28.53 (0.25 mole) of trans-1,2-bis-(aminomethyl)cyclobutane.

The polyamide produced had a reduced viscosity in a 60–40 mixture, by weight, of phenol and tetrachloroethane of 1.28 and a crystalline melting point of 160° C.

A self-sustaining film, 3 mils thick, was compression molded from a sample of the polyamide.

Properties (film): Tensile modulus=280,000 p.s.i.

A portion of the film was quenched cooled in a manner as described in Example 1.

Properties (quenched film):
  Percent elongation=450
  Impact strength=300 ft. lbs./inch³

*Example 3*

In a Waring Blendor there was placed 1.14 grams (0.01 mole) of trans-1,2-bis(aminomethyl)cyclobutane in 50 ml. of water which also contained 50 grams of ice and 1.06 grams (0.01 mole) of sodium carbonate. To this mixture there was then added, with stirring, a solution of 1.819 grams (0.01 mole) of the dichloride of trans cyclobutane-1,2-dicarboxylic acid in 150 ml. of dichloromethane. After the addition was completed, stirring was continued for 5 minutes and the dichloromethane removed from the reacted mixture by heating the reacted mixture on a steam bath. The polyamide recovered was washed with water and dried overnight by being kept under a pressure of 5 mm. of Hg and at a temperature of 105° C.

The polyamide so produced had a reduced viscosity in a 60–40 mixture, by weight, of phenol and tetrachloroethane of 0.28 and a melting point of 200° C.

*Elemental analysis for* $(C_{12}H_{18}O_2N_2)_n$.—Found: C, 62.53; H, 7.14; N, 11.45. Calculated: C, 64.84; H, 8.16; N, 12.61.

*Example 4*

A mixture of 0.9171 gram (0.008036 mole) of trans-1,2-bis(aminomethyl)cyclobutane and 3.4687 grams (0.008036 mole) of diphenyl terephthalate was placed in a tube, sealed therein under an initial pressure of 0.1 mm. of Hg and heated for 12 hrs. at a temperature ranging from 228° C. to 245° C. The temperature was then raised to 275° C. and the heating was continued at that temperature for 1 hour. After cooling, argon gas was introduced into the tube and the contents were heated in the argon atmosphere for 1 hour at temperatures ranging from 275° C. to 288° C. A pressure of 0.04 mm. of Hg was then effected and heating at 250° C. to 254° C. was continued for 2.5 hours.

The polyamide produced was a pale yellow product having a melting point of 320° C. and a reduced viscosity in the concentrated sulfuric acid (94% by weight) of 0.59.

*Example 5*

Following the procedure set forth in Example 1, a salt was prepared from 1,2-bis(aminomethyl)cyclobutane and adipic acid using equimolar amounts of reactants.

Another salt was prepared in the same manner from 1,2-bis(aminomethyl)cyclobutane and sebacic acid.

A polyamide was then prepared by heating 0.5 gram of the sebacic acid salt with 1.5 grams of the adipic acid salt as described in Example 1.

The polyamide so produced had a reduced viscosity in a 60–40 mixture, by weight, of phenol and tetrachloroethane of 1.34 and a melting point of 150° C.

A self-sustaining film, 3 mils thick was prepared by compression molding a sample of the polyamide.

Properties (film): Tensile modulus=260,000 p.s.i.

A second polyamide was prepared by heating 1 gram of the sebacic acid salt, described above, as described in Example 1.

This second polyamide had a reduced viscosity in a 60–40 mixture, by weight, of phenol and tetrachloroethane of 1.29.

A third polyamide was prepared by heating 1.5 grams of the sebacic acid salt, described above, with 0.5 gram of the adipic acid salt, described above, as described in Example 1.

This third polyamide had a reduced viscosity in a 60–40 mixture, by weight, of phenol and tetrachloroethane of 1.14.

For purposes of comparison a polyamide having a reduced viscosity in a 60–40 mixture, by weight, of phenol and tetrachloroethane of 1.23 was prepared from adipic acid and hexamethylene diamine in a manner as described in Example 1. A self-sustaining film of 3 mils was compression molded therefrom and its impact strength determined. The impact strength of this polymer was only 225 ft. lbs./inch³.

*Example 6*

A polyamide was prepared using the same procedures as described in Example 1 with the exception that isophthalic acid, in the same equivalent amount, was used in lieu of adipic acid.

The polyamide so produced was completely amorphous, had a reduced viscosity in dimethyl formamide of 0.35 and had a softening point of 180° C.

What is claimed is:

1. A cyclic amide having the formula:

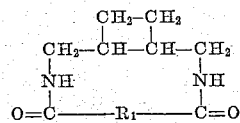

wherein $R_1$ is divalent hydrocarbon containing a maximum of 12 carbon atoms.

2. A cyclic amide as defined in claim 1 wherein $R_1$ is alkylene.
3. A cyclic amide as defined in claim 1 wherein $R_1$ is alkylene having 2 to 10 carbon atoms inclusive.
4. A cyclic amide as defined in claim 1 wherein $R_1$ is arylene.
5. A cyclic amide as defined in claim 1 wherein $R_1$ is arylene having 6 to 12 carbon atoms inclusive.
6. A cyclic amide as defined in claim 1 wherein $R_1$ is cycloalkylene.
7. A cyclic amide as defined in claim 1 wherein $R_1$ is cycloalkylene having 3 to 6 carbon atoms inclusive.
8. A cyclic amide as defined in claim 1 wherein $R_1$ is tetramethylene.
9. A process for the preparation of cyclic amides having the formula:

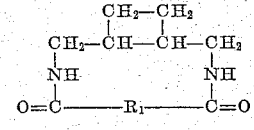

wherein $R_1$ is divalent hydrocarbon containing a maximum of 12 carbon atoms which comprises reacting 1,2-bis(aminomethyl)cyclobutane with a dicarboxylic acid to form the corresponding salt and thereafter heating the said salt at a temperature of about 260° C. to about 300° C. under a pressure of about 0.1 mm. of Hg to about 0.4 mm. of Hg and recovering the cyclic amide which is formed.

10. A process as defined in claim 9 wherein the said dicarboxylic acid has the formula:

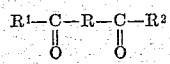

wherein R is as defined for $R_1$ and $R^1$ and $R^2$ are hydroxyl.

11. A process as defined in claim 10 wherein R is arylene.

12. A process as defined in claim 10 wherein R is alkylene.

13. A process as defined in claim 10 wherein R is cycloalkylene.

14. A process as defined in claim 10 wherein R is tetramethylene.

References Cited by the Examiner

UNITED STATES PATENTS

| | | | |
|---|---|---|---|
| 2,683,145 | 7/54 | Lyle et al. | 260—239 |
| 2,775,589 | 12/56 | Diamond et al. | 260—239 |
| 2,931,789 | 4/60 | Wielicki | 260—78 |
| 3,017,395 | 1/62 | Elam et al. | 260—78 |
| 3,074,914 | 1/63 | Armen | 260—78 |

IRVING MARCUS, *Primary Examiner.*

J. R. LIBERMAN, WALTER A. MODANCE,
*Examiners.*